(12) United States Patent
Ohgaki et al.

(10) Patent No.: US 10,770,766 B2
(45) Date of Patent: Sep. 8, 2020

(54) HEATING CONTROL DEVICE

(71) Applicant: HONDA MOTOR CO., LTD., Tokyo (JP)

(72) Inventors: Toru Ohgaki, Saitama (JP); Eiki Kamaya, Saitama (JP); Yoshikazu Kemmoku, Saitama (JP); Keisuke Fujimaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 15/759,614

(22) PCT Filed: Sep. 28, 2015

(86) PCT No.: PCT/JP2015/077364
§ 371 (c)(1),
(2) Date: Mar. 13, 2018

(87) PCT Pub. No.: WO2017/056161
PCT Pub. Date: Apr. 6, 2017

(65) Prior Publication Data
US 2019/0039477 A1 Feb. 7, 2019

(51) Int. Cl.
*H01M 10/6571* (2014.01)
*B60L 58/27* (2019.01)
(Continued)

(52) U.S. Cl.
CPC .......... *H01M 10/6571* (2015.04); *B60L 1/02* (2013.01); *B60L 50/60* (2019.02); *B60L 58/12* (2019.02);
(Continued)

(58) Field of Classification Search
CPC .......... H01M 10/6571; H01M 10/615; H01M 10/625; H01M 10/633; B60L 58/27; B60L 58/12; B60L 1/02
See application file for complete search history.

(56) References Cited

U.S. PATENT DOCUMENTS

2011/0288704 A1* 11/2011 Schwarz ............. H01M 10/625
701/22
2012/0123626 A1 5/2012 Takahashi1 et al.
(Continued)

FOREIGN PATENT DOCUMENTS

JP   2003-023704 A   1/2003
JP   2011-018531 A   1/2011
(Continued)

OTHER PUBLICATIONS

Nov. 2, 2015, International Search Report issued for related WO application No. PCT/JP2015/077364.
(Continued)

*Primary Examiner* — Jonathan G Jelsma
(74) *Attorney, Agent, or Firm* — Paratus Law Group, PLLC

(57) ABSTRACT

A heating control device includes: a storage battery that supplies electric power to an electric motor of an electric vehicle; a heat generation portion that heats the storage battery using heat generated by current flowing; an estimation portion that estimates a change in effective capacity when the heat generation portion heats the storage battery to a target temperature using heat generated by current flowing due to electric power supplied from the storage battery based on an effective capacity corresponding to a temperature and a state of charge of the storage battery; and a controller that causes current flowing from the storage battery to the heat generation portion only in a case where the effective capac-
(Continued)

ity estimated by the estimation portion is expected to be improved.

5 Claims, 12 Drawing Sheets

(51) Int. Cl.
H01M 10/625 (2014.01)
H01M 10/615 (2014.01)
H01M 10/633 (2014.01)
B60L 58/12 (2019.01)
H02J 7/00 (2006.01)
B60L 1/02 (2006.01)
B60L 50/60 (2019.01)

(52) U.S. Cl.
CPC ........... *B60L 58/27* (2019.02); *H01M 10/615* (2015.04); *H01M 10/625* (2015.04); *H01M 10/633* (2015.04); *H02J 7/00* (2013.01); *B60L 2240/36* (2013.01); *B60L 2240/545* (2013.01); *B60L 2240/547* (2013.01); *B60L 2240/549* (2013.01); *B60L 2240/80* (2013.01); *B60L 2260/44* (2013.01); *H01M 2220/20* (2013.01); *H02J 7/0063* (2013.01); *H02J 7/0068* (2013.01); *Y02T 10/7005* (2013.01); *Y02T 10/7022* (2013.01)

(56) References Cited

U.S. PATENT DOCUMENTS

| 2012/0137086 A1 | 5/2012 | Oe et al. |
| 2014/0008348 A1 | 1/2014 | Otsuka |

FOREIGN PATENT DOCUMENTS

| JP | 2012-113662 A | 6/2012 |
| JP | 2012-133900 A | 7/2012 |
| JP | 2012-209213 A | 10/2012 |
| JP | 2015-119377 A | 6/2015 |
| WO | WO 2005/024915 A1 | 3/2005 |

OTHER PUBLICATIONS

Nov. 2, 2015, International Search Opinion issued for related WO application No. PCT/JP2015/077364.
Aug. 29, 2017, Written Opinion issued for related WO application No. PCT/JP2015/077364.

* cited by examiner

HEATING CONTROL DEVICE

CROSS REFERENCE TO PRIOR APPLICATION

This application is a National Stage Patent Application of PCT International Patent Application No. PCT/2015/077364 (filed on Sep. 28, 2015) under 35 U.S.C. § 371, which is hereby incorporated by reference in its entirety.

TECHNICAL FIELD

The present invention relates to a heating control device for a storage battery mounted on an electric vehicle.

BACKGROUND ART

Patent Literature 1 describes an electric vehicle charging system that heats a storage battery of an electric vehicle using heat transferred from a heat storage material included in the electric vehicle depending on the temperature of the storage battery when the storage battery is charged. With the system, the storage battery can be heated using the heat storage material included in the electric vehicle, and it is not necessary to secure electric power for heating by allocating a part of charging electric power during charging. In a case where the temperature of the storage battery is low, it is necessary that the storage battery is heated in order to prevent deterioration in the performance of the storage battery caused by charging. At this time, by supplying a heat source from the heat storage material included in the electric vehicle, electric power supplied from home can be efficiently used to charge the storage battery.

PRIOR ART LITERATURE

Patent Literature

Patent Literature 1: JP-A-2012-209213

SUMMARY OF THE INVENTION

Problems that the Invention is to Solve

In the electric vehicle charging system described in Patent Literature 1, mainly, a so-called plug-in electric vehicle that receives electric power supplied from home includes a heat storage material in addition to a storage battery, in which the storage battery is preheated by heat transferred from the heat storage material before charging the storage battery. The preheating is performed to prevent deterioration in the performance of the storage battery that occurs when the storage battery is charged at a low temperature.

However, when the storage battery is discharged at a low temperature, deterioration in the performance of the storage battery also occurs as in the case of charging. For example, as illustrated in FIG. 14, even in a case where the state of charge (SOC) of a storage battery is high, the effective capacity of the storage battery decreases at a temperature of the freezing point or lower. Therefore, in a case where the ambient temperature of a storage battery is low, it is desirable to heat the storage battery until discharging.

Assuming that a storage battery is heated in a state where a plug-in electric vehicle is parked, in a case where the electric vehicle is plugged in, electric power supplied from an external power supply is mainly used, and in a case where the electric vehicle is not plugged in, electric power supplied from the storage battery included in the electric vehicle is used. This way, energy that is used to heat a storage battery in a state where an electric vehicle is parked is electric power, and electric power is consumed to heat the storage battery irrespective of whether the electric vehicle is plugged in or not.

An object of the present invention is to provide a heating control device that can effectively consume electric power required to heat a storage battery so as to improve the performance of the storage battery.

Means for Solving the Problem

With a view to achieving the object, Claim 1 defines a heating control device including:
a storage battery (e.g., a storage battery 103 in an embodiment to be described below) that supplies electric power to an electric motor as a driving source of an electric vehicle;
a heat generation portion (e.g., a heater 115 in the embodiment to be described below) that heats the storage battery using heat generated by current flowing:
an effective capacity estimation portion (e.g., an effective capacity change estimation portion 167 in the embodiment to be described below) that estimates a change in effective capacity when the heat generation portion heats the storage battery to a target temperature using heat generated by current flowing due to electric power supplied from the storage battery) based on an effective capacity of the storage battery corresponding to a temperature of the storage battery and a state of charge of the storage battery: and
a first controller (e.g., a current flow controller 169 in the embodiment to be described below) that causes a current to flow from the storage battery to the heat generation portion only in a case where the effective capacity estimated by the effective capacity estimation portion is expected to be improved.

Claim 2 defines, based on Claim 1, the heating control device, wherein
the effective capacity estimation portion includes a state-of-charge estimation portion (e.g., an SOC change estimation portion 165 in the embodiment to be described below) that estimates a change in the state of charge of the storage battery when the storage battery supplies electric power required for the heat generation portion to heat the storage battery to the target temperature,
the change in effective capacity estimated by the effective capacity estimation portion is a change from an effective capacity, which corresponds to a temperature of and a state of charge of the storage battery before heating by the heat generation portion, to an effective capacity which corresponds to the target temperature and a state of charge of the storage battery after heating estimated by the state-of-charge estimation portion, and
only in a case where a change in effective capacity shows an increase of a predetermined amount of more, the first controller causes a current to flow from the storage battery to the heat generation portion until the temperature of the storage battery reaches the target temperature.

Claim 3 defines, based on Claim 1 or 2, the heating control device further including:
a second controller (e.g., an ECU 121 in the embodiment to be described below) that lowers a lower limit temperature of the storage battery stepwise depending on a duration time during which the electric vehicle is not operated and that controls current flowing from the storage battery to the heat generation portion every time the temperature of the storage battery decreases up to the lower limit temperature.

Claim 4 defines, based on Claim 3, the heating control device, wherein until the lower limit temperature reaches an absolute lower limit temperature, the second controller lowers the lower limit temperature every time causing current flowing from the storage battery to the heat generation portion.

Claim 5 defines, based on Claim 3 or 4, the heating control device, wherein every time the temperature of the storage battery decreases up to the lower limit temperature, the second controller controls current flowing from the storage battery to the heat generation portion such that the storage battery is heated from the lower limit temperature by a predetermined value.

Claim 6 defines, based on any one of Claims 1 to 5, the heating control device, wherein when the first controller or the second controller controls current flowing to the heat generation portion, the electric vehicle is in a state where electric power is not supplied from an external power supply.

Advantageous Effects of the Invention

According to Claim 1, only in a case where the effective capacity of the storage battery is expected to be improved by even consuming electric power of the storage battery to heat the storage battery, a current is caused to flow to the heat generation portion from the storage battery. Therefore, electric power stored in the storage battery can be efficiently consumed to improve the performance of the storage battery.

According to Claim 2, only in a case where the change in effective capacity is expected to be increased by a predetermined amount or more by even consuming electric power of the storage battery to heat the storage battery, a current is caused to flow to the heat generation portion from the storage battery. Therefore, electric power stored in the storage battery can be efficiently consumed to improve the performance of the storage battery.

According to Claim 3, even in a case where a state where the electric vehicle is not operated in a very low temperature environment is continued for a long period of time, the lower limit temperature of the storage battery is lowered stepwise, and the storage battery is heated every time the temperature of the storage battery decreases up to the lower limit temperature. Therefore, the temperature of the storage battery decreases for a long period of time. Accordingly, a period of time during which the output of the storage battery is improved can be lengthened as compared to a case where the lower limit temperature of the storage battery is uniformly set as the absolute lower limit temperature, the storage battery having a configuration in which the performance deteriorates as the temperature decreases. In addition, in a case where the lower limit temperature is lowered stepwise, the amount of electric power consumed to keep the storage battery at the lower limit temperature or higher is smaller than the amount of electric power consumed to keep the storage battery at the absolute lower limit temperature or higher in a case where the lower limit temperature is uniformly set as the absolute lower limit temperature. Therefore, the amount of electric power consumed to keep the storage battery at the absolute lower limit temperature or higher can be reduced.

According to Claim 4, the lower limit temperature is lowered every time a current is caused to flow to the heat generation portion from the storage battery. As a result, the temperature of the storage battery decreases for a long period of time after it repeatedly increases and decreases. Accordingly, a period of time during which the output of the storage battery is improved can be lengthened.

According to Claim 5, the storage battery is heated by a predetermined value every time the temperature of the storage battery decreases up to the lower limit temperature. As a result, the temperature of the storage battery decreases for a long period of time after it repeatedly increases and decreases. Accordingly, a period of time during which the output of the storage battery is improved can be lengthened.

According to Claim 6, although an electric power source for heating the storage battery in the electric vehicle to which electric power is not supplied from an external power supply is only the storage battery, electric power stored in the storage battery can be efficiently consumed to improve the performance of the storage battery.

MODES FOR CARRYING OUT THE INVENTION

Hereinafter, an embodiment of the present invention will be described with reference to the drawings.

First Embodiment

Figure 1:
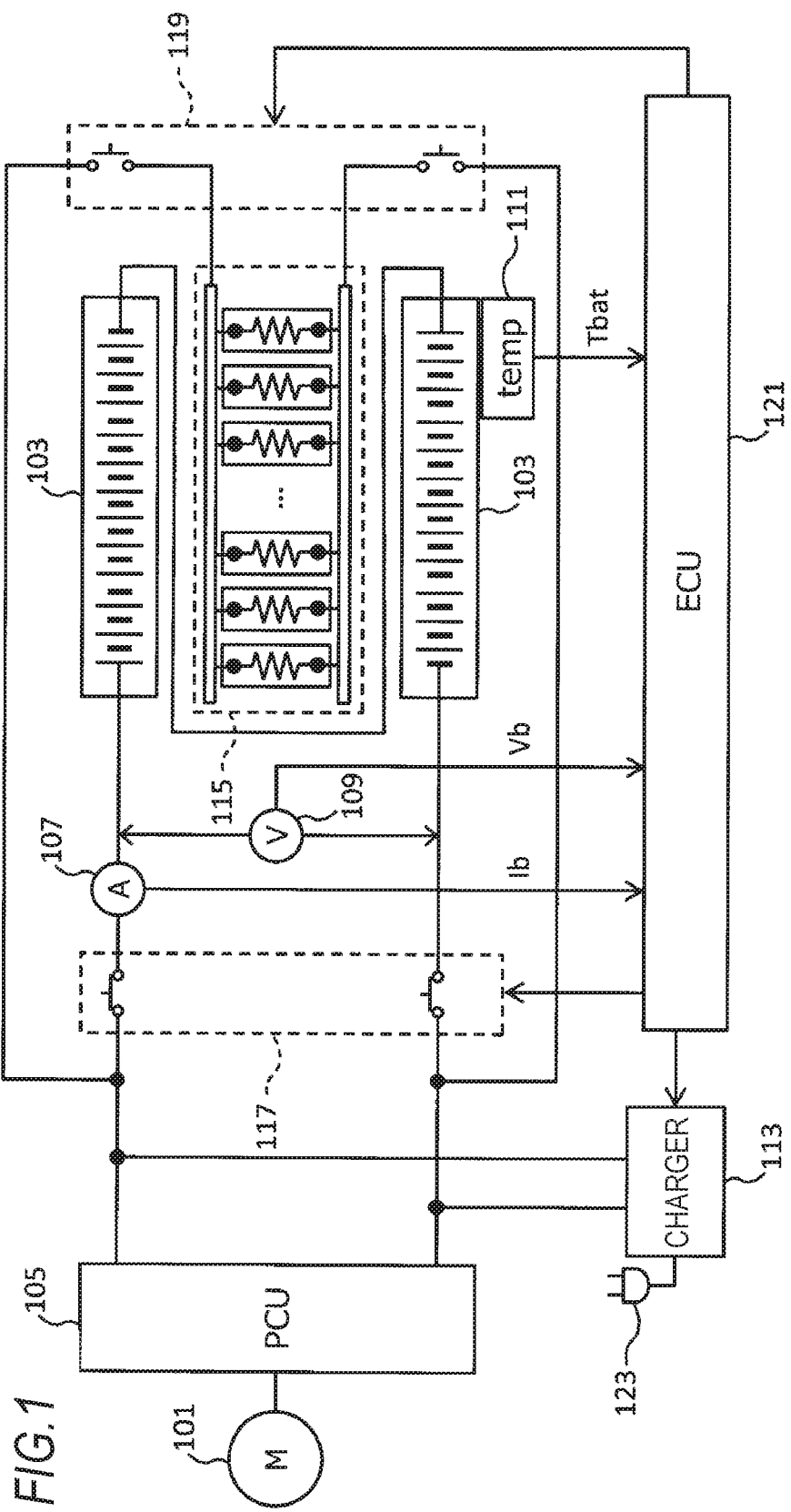
FIG. 1 is a block diagram illustrating a configuration of a heating control device according to a first embodiment.

A heating control device according to a first embodiment is mounted on a plug-in electric vehicle such as an EV (electric vehicle) or a HEV (hybrid electrical vehicle) in which an electric motor that is driven by electric power supplied from a storage battery is provided as a driving source. FIG. 1 is a block diagram illustrating a configuration of the heating control device according to the first embodiment. As illustrated in FIG. 1, the heating control device according to the first embodiment includes an electric motor 101, a storage battery 103, a PCU (power control unit) 105, a current sensor 107, a voltage sensor 109, a temperature sensor 111, a charger 113, a heater 115, switch portions 117 and 119, and an ECU (electrical control unit) 121.

The electric motor 101 is a driving source that generates power for allowing the electric vehicle to travel.

The storage battery 103 includes plural storage cells such as a lithium ion battery or a nickel-metal hydride battery and supplies high-voltage power to the electric motor 101. In a case where the storage battery 103 as a secondary battery is used, it is necessary to monitor the state of charge (SOC) of the storage battery 103 all the time and to perform a control of preventing overcharging or overdischarging. While the above-described control is being performed, the storage battery 103 is repeatedly charged and discharged in a SOC range (0% to 100%) where the storage battery 103 can be used. The SOC of the storage battery 103 is calculated based on an integrated value of a charging-discharging current of the storage battery 103 and/or an open circuit voltage (OCV) of the storage battery 103.

The PCU 105 convers direct current power output from the storage battery 103 into alternating current power. The PCU 105 may boost or drop a direct current voltage output from the storage battery 103 as it is and then may convert the boosted or dropped direct current voltage into an alternating current voltage.

The current sensor 107 detects a charging-discharging current of the storage battery 103. A signal indicating the current value detected by the current sensor 107 is transmitted to the ECU 121. The voltage sensor 109 detects a terminal voltage (closed circuit voltage (CCV)) of the storage battery 103. A signal indicating the voltage value detected by the voltage sensor 109 is transmitted to the ECU 121. The temperature sensor 111 detects a temperature of the storage battery 103. A signal indicating the temperature of the storage battery 103 detected by temperature sensor 111 is transmitted to the ECU 121.

The charger 113 converts alternating current electric power supplied from an external power supply (not illustrated) in direct current electric power in a state where a plug 123 is connected to the external power supply. The direct current electric power converted by the charger 113 is supplied to at least one of the storage battery 103 or the heater 115.

The heater 115 generates heat by current flowing, the current being obtained from the storage battery 103 or obtained from the external power supply (not illustrated) through the charger 113. Due to the heat, the storage battery 103 is heated.

The switch portion 117 opens and closes a current path from the charger 113 to the storage battery 103. In addition, the switch portion 119 opens and closes a current path from the storage battery 103 or the charger 113 to the heater 115. The switch portions 117 and 119 are opened and closed under the control of the ECU 121.

The ECU 121 performs, for example, a control that relates to heating of the storage battery 103 using the heater 115 in a case where the electric vehicle is parked. In the embodiment, the ECU 121 performs the control in a case where the plug 123 is not connected to the external power supply.

Example 1

Figure 2:
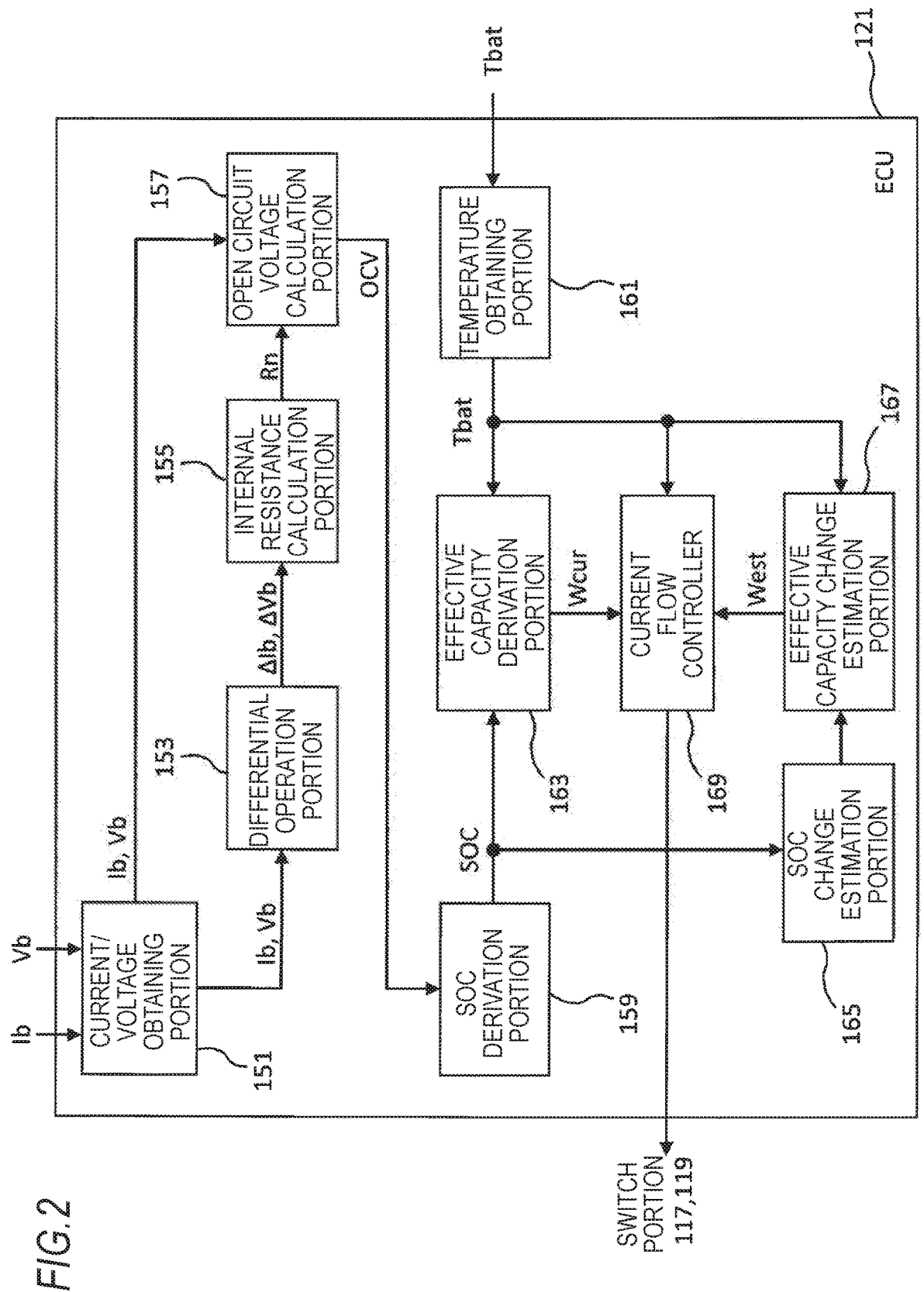
FIG. 2 is a block diagram illustrating an internal configuration of an ECU according to Example 1 of the first embodiment.

FIG. 2 is a block diagram illustrating an internal configuration of the ECU 121 according to Example 1 of the first embodiment. As illustrated in FIG. 2, the ECU 121 includes a current/voltage obtaining portion 151, a differential operation portion 153, an internal resistance calculation portion 155, an open circuit voltage calculation portion 157, an SOC derivation portion 159, a temperature obtaining portion 161, an effective capacity derivation portion 163, an SOC change estimation portion 165, an effective capacity change estimation portion 167, and a current flow controller 169.

The current/voltage obtaining portion 151 obtains a charging-discharging current Ib detected by the current sensor 107 and a terminal voltage Vb detected by the voltage sensor 109. The differential operation portion 153 differentiates each of the charging-discharging current Ib and the terminal voltage Vb obtained by the current/voltage obtaining portion 151. The internal resistance calculation portion 155 calculates an internal resistance Rn of the storage battery 103 from the following Expression (1) based on a differential value ΔIb of the charging-discharging current Ib and a differential value ΔVb of the terminal voltage Vb calculated by the differential operation portion 153.

$$Rn = \Delta Vb/\Delta Ib \quad (1)$$

The open circuit voltage calculation portion 157 calculates an open circuit voltage OCV of the storage battery 103 from the following Expression (2) based on the internal resistance Rn calculated by the internal resistance calculation portion 155 and the charging-discharging current Ib and the terminal voltage Vb obtained by the current/voltage obtaining portion 151.

$$OCV = Vb + Ib \times Rn \quad (2)$$

Figure 3:
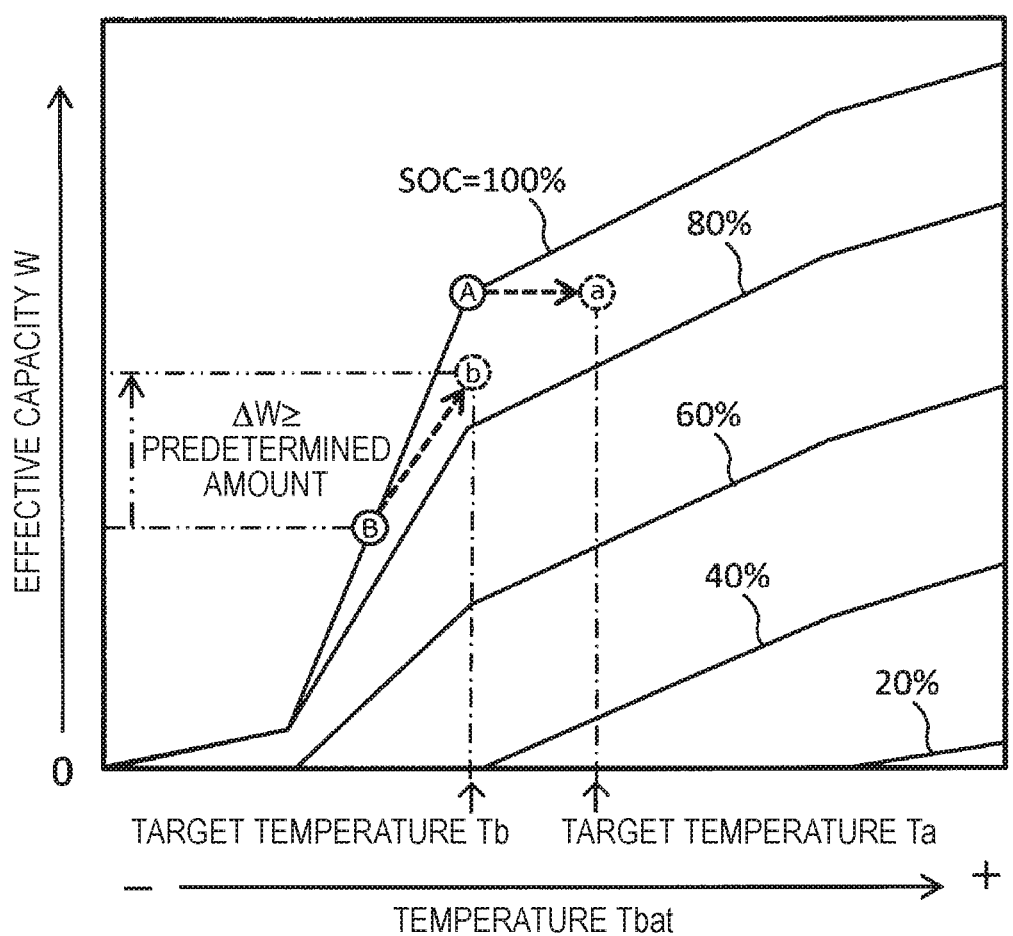
FIG. 3 is a graph illustrating an effective capacity corresponding to a temperature and an SOC of a storage battery.

The SOC derivation portion 159 derives an SOC of the storage battery 103 from the open circuit voltage OCV calculated by the open circuit voltage calculation portion 157 using a map. The temperature obtaining portion 161 obtains a temperature Tbat of the storage battery 103 detected by the temperature sensor 111. The effective capacity derivation portion 163 derives a current effective capacity Wcur of the storage battery 103 corresponding to the SOC of the storage battery 103 derived by the SOC derivation portion 159 and the temperature Tbat of the storage battery 103 obtained by the temperature obtaining portion 161. In order to derive the effective capacity Wcur, a map based on, for example, a graph representing an effective capacity corresponding to the temperature and the SOC of the storage battery 103 illustrated in FIG. 3 is used.

The SOC change estimation portion 165 estimates a change in the SOC of the storage battery 103 in a case where a current flows through the heater 115 due to electric power supplied from the storage battery 103 to heat the storage battery 103 to a target temperature. The change in the SOC is estimated according to the amount of electric power consumed by the heater 115.

The effective capacity change estimation portion 167 estimates an effective capacity West of the storage battery 103 in a case where the heater 115 heats the storage battery 103 to a target temperature using heat generated by current flowing due to electric power supplied from the storage battery 103. In order to derive the effective capacity West, the map based on, for example, the graph representing an effective capacity corresponding to the temperature and the SOC of the storage battery 103 illustrated in FIG. 3 is used. As the temperature of the storage battery 103, the target temperature is used. As the SOC of the storage battery 103, the SOC after heating estimated by the SOC change estimation portion 165 is used.

In a case where a change (=effective capacity West-effective capacity Wcur) from the current effective capacity Wcur of the storage battery 103 derived by the effective capacity derivation portion 163 to the effective capacity West of the storage battery 103 estimated by the effective capacity change estimation portion 167 shows an increase of a predetermined amount or more, a current flows through the heater 115 due to electric power supplied from the storage battery 103. Therefore, the current flow controller 169 causes the switch portions 117 and 119 to be closed until the temperature Tbat of the storage battery 103 reaches the target temperature. On the other hand, in a case where the change in effective capacity shows an increase of less than the predetermined amount, the current flow controller 169 does not change an opened/closed state of the switch portions 117 and 119.

According to the heating control of the storage battery 103 using the heater 115 by the ECU 121 according to the example in a case the electric vehicle is parked without the plug 123 being connected to the external power supply, the effective capacity does not change even in a case where the storage battery 103 in which the temperature and the SOC are in a state indicated by "A" in FIG. 3 is heated to a target temperature Ta. Therefore the current flow controller 169 does not change the opened/closed state of the switch portions 117 and 119. On the other hand, in a case where the storage battery 103 in which the temperature and the SOC are in a state indicated by "B" in FIG. 3 reaches a target temperature Tb, the change ΔW in effective capacity is expected to be increased by a predetermined amount or more. Therefore, the current flow controller 169 causes the switch portions 117 and 119 to be closed, and causes a current to flow through the heater 115 using electric power supplied from the storage battery 103.

As described above, according to the example, only in a case where the change in the effective capacity of the storage battery 103 is expected to be increased by a predetermined amount or more by consuming electric power of the storage battery 103 to heat the storage battery 103, a current flows through the heater 115 from the storage battery 103. Therefore, electric power stored in the storage battery 103 can be efficiently consumed to improve the performance of the storage battery 103.

Example 2

Figure 4:
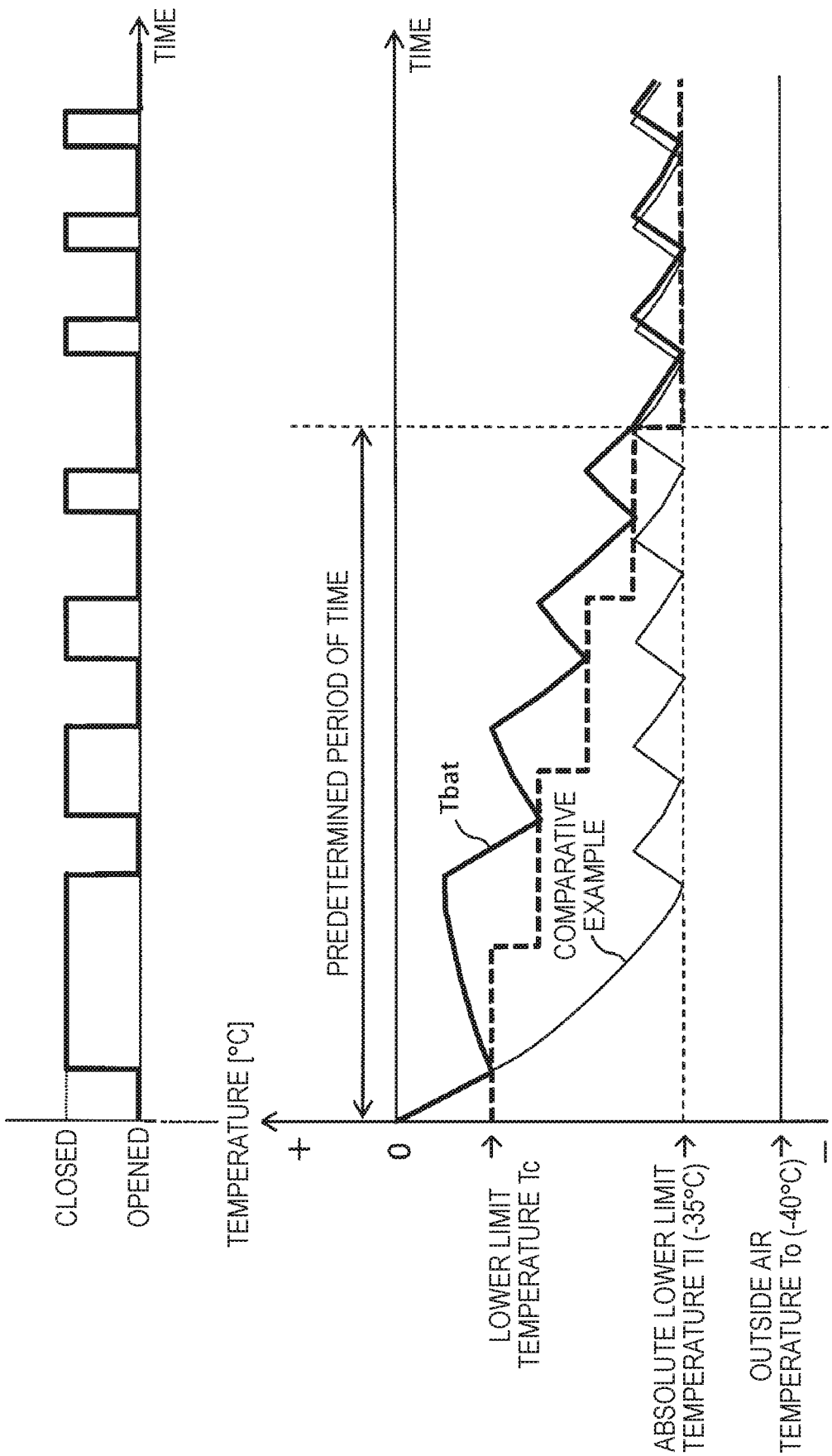
FIG. 4 is a diagram illustrating a control that relates to heating of the storage battery using a heater according to Example 2 of the first embodiment.

FIG. 4 is a diagram illustrating a control that relates to heating of the storage battery 103 using the heater 115 according to Example 2 of the first embodiment. In an example illustrated in FIG. 4, it is assumed that a state where the electric vehicle travels in a very low temperature environment and then is parked in the same temperature environment without the plug 123 being connected to the external power supply is continued. Even in a case where the temperature of the storage battery 103 in the electric vehicle immediately after the traveling is stopped is, for example, 0° C., an outside air temperature To is a very low temperature (for example, −40° C.) that is much lower than 0° C. Therefore, the temperature Tbat of the storage battery 103 decreases. However, in a case where the storage battery 103 decreases up to the outside air temperature To, the output of the storage battery 103 significantly decreases, and the electric vehicle cannot travel. Therefore, it is necessary to keep the storage battery 103 at a temperature higher than an absolute lower limit temperature Tl (for example, −35° C.) that is higher than the outside air temperature To.

Therefore, in a case where the temperature Tbat of the storage battery 103 detected by the temperature sensor 111 decreases up to the absolute lower limit temperature Tl as illustrated in "Comparative Example" of FIG. 4, the ECU 121 causes the switch portions 117 and 119 to be closed and causes a current to flow through the heater 115 using electric power supplied from the storage battery 103 such that the temperature Tbat of the storage battery 103 is higher than the absolute lower limit temperature Tl by a predetermined temperature or higher. As a result, the heater 115 does not operate for a while after the start of parking, but the heater 115 operates regularly after the temperature Tbat of the storage battery 103 decreases to the absolute lower limit temperature Tl.

Figure 5:
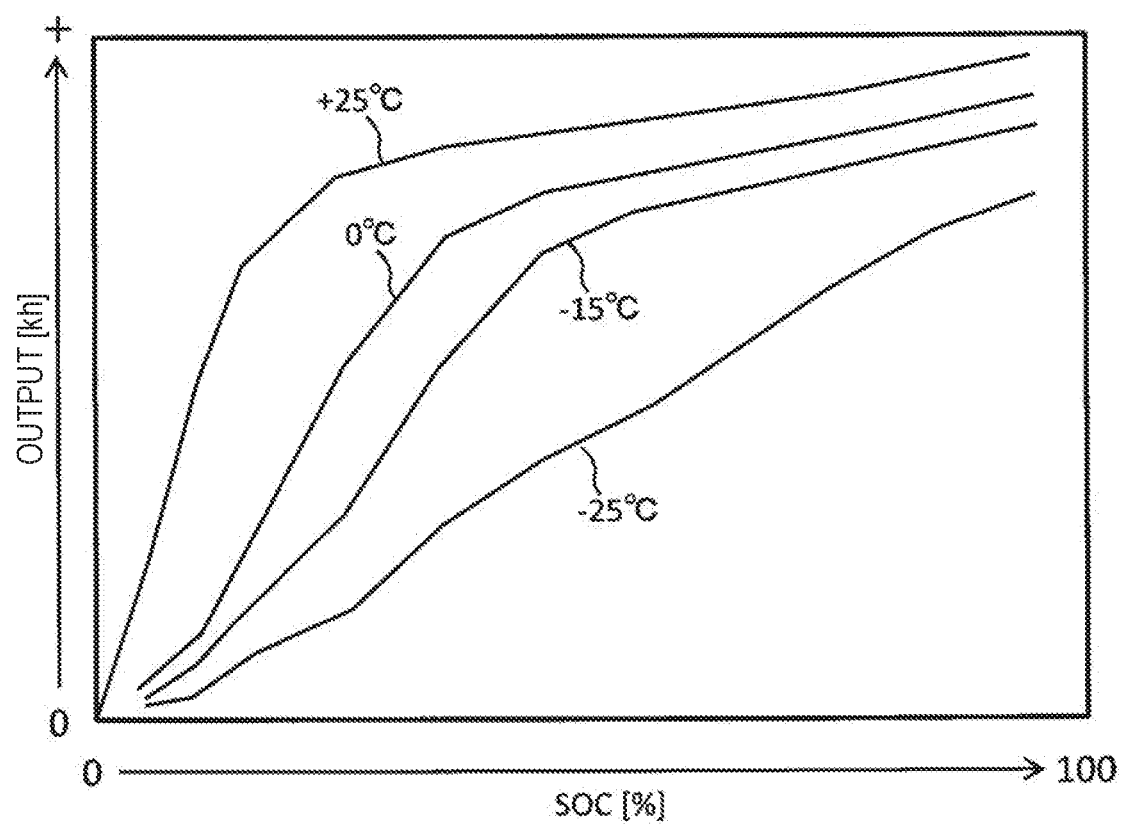
FIG. 5 is a graph illustrating an output corresponding to the temperature and the SOC of the storage battery.

However, as illustrated in FIG. 5, the output of the storage battery 103 decreases even at the same SOC as the temperature Tbat decreases. Therefore, the ECU 121 according to the example decreases a lower limit temperature Tc of the storage battery 103 to the absolute lower limit temperature stepwise based on a parking duration time after parking, and causes a current to flow through the heater 115 using electric power supplied from the storage battery 103 every time the temperature Tbat of the storage battery 103 decreases up to the lower limit temperature Tc. At this time, the ECU 121 causes the switch portions 117 and 119 to be closed and causes a current to flow through the heater 115 using electric power supplied from the storage battery 103 such that the temperature Tbat of the storage battery 103 is higher than the lower limit temperature Tc by a predetermined temperature or higher, and decreases the lower limit temperature Tc by one level. This way, by heating the storage battery 103 every time the temperature Tbat of the storage battery 103 decreases up to the lower limit temperature Tc, the temperature Tbat of the storage battery 103 decreases for a long period of time after it repeatedly increases and decreases.

As described above, according to the example, even in a case where a state where the electric vehicle is parked in a very low temperature environment is continued for a long period of time, the lower limit temperature Tc of the storage battery 103 is lowered stepwise, and the storage battery 103 is heated by a predetermined value every time the temperature Tbat of the storage battery 103 decreases up to the lower limit temperature Tc. As a result, the temperature Tbat of the storage battery 103 decreases for a long period of time after it repeatedly increases and decreases. Accordingly, a period of time during which the output of the storage battery 103 after the start of parking is improved can be lengthened. In addition, in the example, the amount of electric power consumed by the heater 115 is less than that of Comparative Example. Therefore, the amount of electric power consumed to keep the storage battery 103 at the absolute lower limit temperature Tl or lower can be reduced.

Second Embodiment

Figure 6:
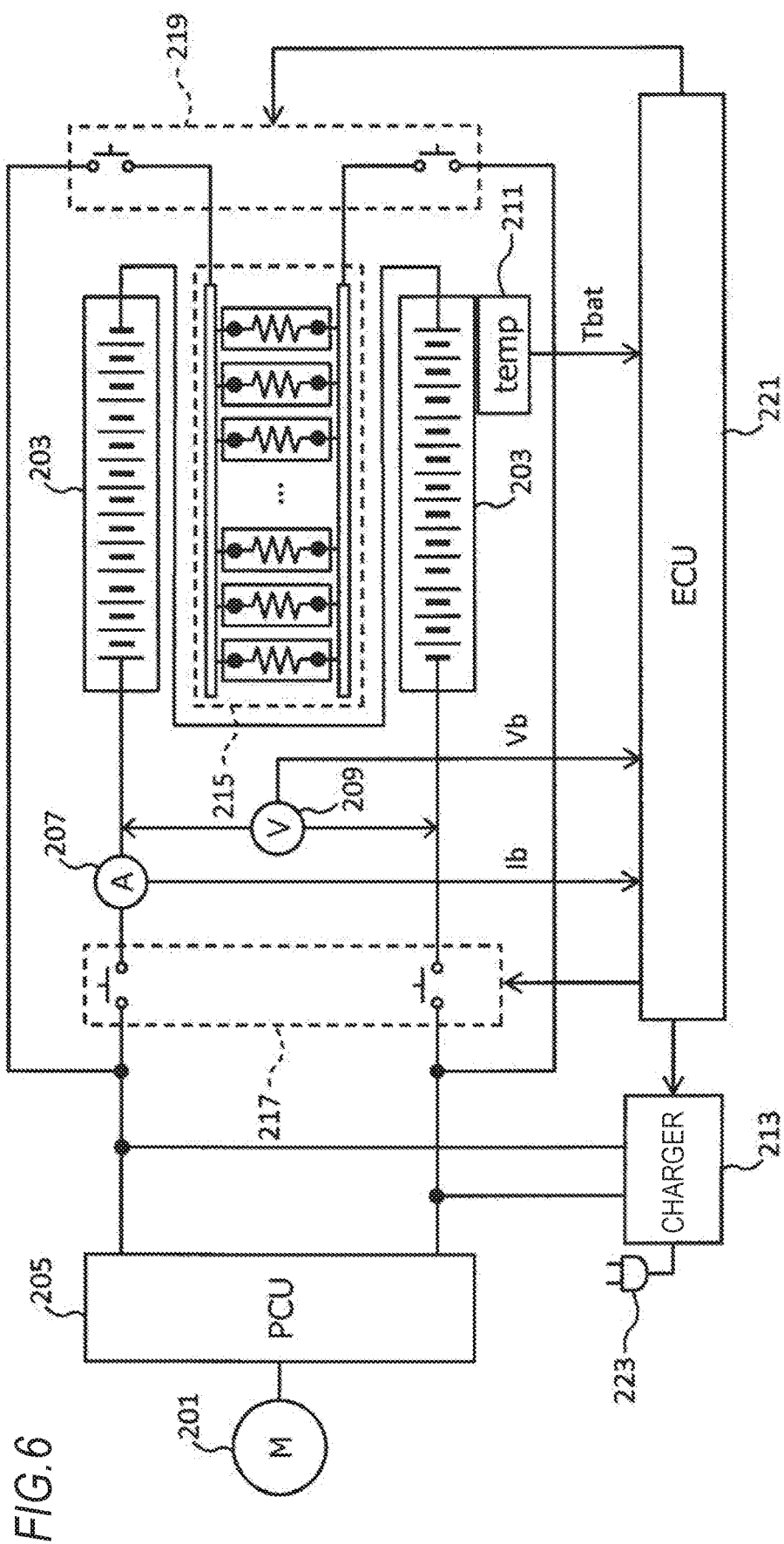
FIG. 6 is a block diagram illustrating a configuration of an electric power consumption control device according to a second embodiment.

An electric power consumption control device according to a second embodiment is mounted on a plug-in electric vehicle such as an EV (electric vehicle) or a HEV (hybrid electrical vehicle) in which an electric motor that is driven by electric power supplied from a storage battery is provided as a driving source. FIG. 6 is a block diagram illustrating a configuration of the electric power consumption control device according to the second embodiment. As illustrated in FIG. 6, the electric power consumption control device according to the second embodiment includes an electric motor 201, a storage battery 203, a PCU (power control unit) 205, a current sensor 207, a voltage sensor 209, a temperature sensor 211, a charger 213, a heater 215, switch portions 217 and 219, and an ECU (electrical control unit) 221.

The electric motor 201 is a driving source that generates power for allowing the electric vehicle to travel.

The storage battery 203 includes plural storage cells such as a lithium ion battery or a nickel-metal hydride battery and supplies high-voltage power to the electric motor 201. In a case where the storage battery 203 as a secondary battery is used, it is necessary to monitor the state of charge (SOC) of the storage battery 203 all the time and to perform a control of preventing overcharging or overdischarging. While the above-described control is being performed, the storage battery 203 is repeatedly charged and discharged in a SOC range (0% to 100%) where the storage battery 203 can be used. The SOC of the storage battery 203 is calculated based on an integrated value of a charging-discharging current of the storage battery 203 and/or an open circuit voltage (OCV) of the storage battery 203.

The PCU 205 convers direct current power output from the storage battery 203 into alternating current power. The PCU 205 may boost or drop a direct current voltage output from the storage battery 203 as it is and then may convert the boosted or dropped direct current voltage into an alternating current voltage.

The current sensor 207 detects a charging-discharging current of the storage battery 203. A signal indicating the current value detected by the current sensor 207 is transmitted to the ECU 221. The voltage sensor 209 detects a terminal voltage (closed circuit voltage (CCV)) of the storage battery 203. A signal indicating the voltage value detected by the voltage sensor 209 is transmitted to the ECU 221. The temperature sensor 211 detects a temperature of the storage battery 203. A signal indicating the temperature of the storage battery 203 detected by temperature sensor 211 is transmitted to the ECU 221.

The charger 213 converts alternating current electric power supplied from an external power supply (not illustrated) in direct current electric power in a state where a plug 223 is connected to the external power supply. The direct current electric power converted by the charger 213 is supplied to at least one of the storage battery 203 or the heater 215.

The heater 215 generates heat by current flowing, the current being obtained from the storage battery 203 or obtained from the external power supply (not illustrated) through the charger 213. Due to the heat, the storage battery 203 is heated.

The switch portion 217 opens and closes a current path from the charger 213 to the storage battery 203. In addition, the switch portion 219 opens and closes a current path from the storage battery 203 or the charger 213 to the heater 215. The switch portions 217 and 219 are opened and closed under the control of the ECU 221.

The ECU 221 performs, for example, a control that relates to heating of the storage battery 203 using the heater 215 in a case where the electric vehicle is parked. In the embodiment, the ECU 221 performs the control in a case where the plug 223 is not connected to the external power supply.

Example 1

Figure 7:
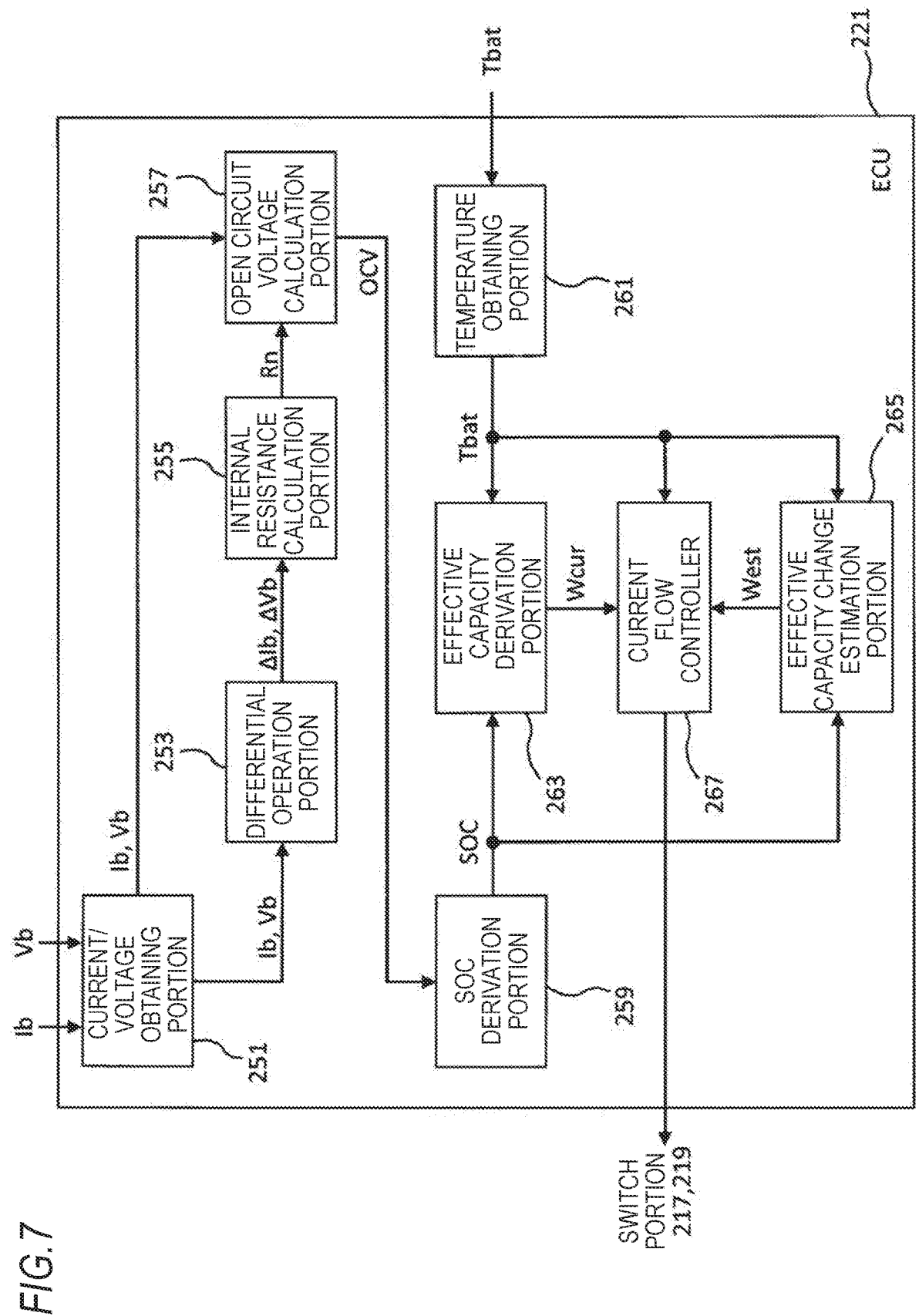
FIG. 7 is a block diagram illustrating an internal configuration of the ECU according to Example 1 of the second embodiment.

FIG. 7 is a block diagram illustrating an internal configuration of the ECU 221 according to Example 1 of the second embodiment. As illustrated in FIG. 7, the ECU 221 includes a current-voltage obtaining portion 251, a differential operation portion 253, an internal resistance calculation portion 255, an open circuit voltage calculation portion 257, an SOC derivation portion 259, a temperature obtaining portion 261, an effective capacity derivation portion 263, an effective capacity change estimation portion 265, and a current flow controller 267.

The current/voltage obtaining portion 251 obtains a charging-discharging current Ib detected by the current sensor 207 and a terminal voltage Vb detected by the voltage sensor 209. The differential operation portion 253 differentiates each of the charging-discharging current Ib and the terminal voltage Vb obtained by the current/voltage obtaining portion 251. The internal resistance calculation portion 255 calculates an internal resistance Rn of the storage battery 203 from the following Expression (3) based on a differential value Δb of the charging-discharging current Ib and a differential value ΔVb of the terminal voltage Vb calculated by the differential operation portion 253.

$$Rn=\Delta Vb/\Delta Ib \qquad (3)$$

The open circuit voltage calculation portion 257 calculates an open circuit voltage OCV of the storage battery 203 from the following Expression (4) based on the internal resistance Rn calculated by the internal resistance calculation portion 255 and the charging-discharging current Ib and the terminal voltage Vb obtained by the current/voltage obtaining portion 251.

$$OCV=Vb+Ib\times Rn \qquad (4)$$

The SOC derivation portion 259 derives an SOC of the storage battery 203 from the open circuit voltage OCV calculated by the open circuit voltage calculation portion 257 using a map. The temperature obtaining portion 261 obtains a temperature Tbat of the storage battery 203 detected by the temperature sensor 211. The effective capacity derivation portion 263 derives a current effective capacity Wcur of the storage battery 203 corresponding to the SOC of the storage battery 203 derived by the SOC derivation portion 259 and the temperature Tbat of the storage battery 203 obtained by the temperature obtaining portion 261. In order to derive the effective capacity Wcur, a map based on, for example, a graph representing an effective capacity corresponding to the temperature and the SOC of the storage battery 203 illustrated in FIG. 8 is used.

The effective capacity change estimation portion 265 estimates an effective capacity West of the storage battery 203 in a case where the heater 215 heats the storage battery 203 to a target temperature using heat generated by current flowing due to electric power supplied from the external power supply. In order to derive the effective capacity West, the map based on, for example, the graph representing an effective capacity corresponding to the temperature and the SOC of the storage battery 203 illustrated in FIG. 8 is used. As the temperature of the storage battery 203, the target temperature is used. As the SOC of the storage battery 203, the SOC derived by the SOC derivation portion 259 is used.

In a case where a change (=effective capacity West-effective capacity Wcur) from the current effective capacity Wcur of the storage battery 203 derived by the effective capacity derivation portion 263 to the effective capacity West of the storage battery 203 estimated by the effective capacity change estimation portion 265 shows an increase of a predetermined amount or more, a current flows through the heater 215 due to electric power supplied from the external power supply through the charger 213. Therefore, the current flow controller 267 causes the switch portion 219 to be closed and causes the switch portion 217 to be opened until the temperature Tbat of the storage battery 203 reaches the target temperature. On the other hand, in a case where the change in effective capacity shows an increase of less than the predetermined amount, the current flow controller 267 does not change an opened/closed state of the switch portions 217 and 219.

Figure 8:
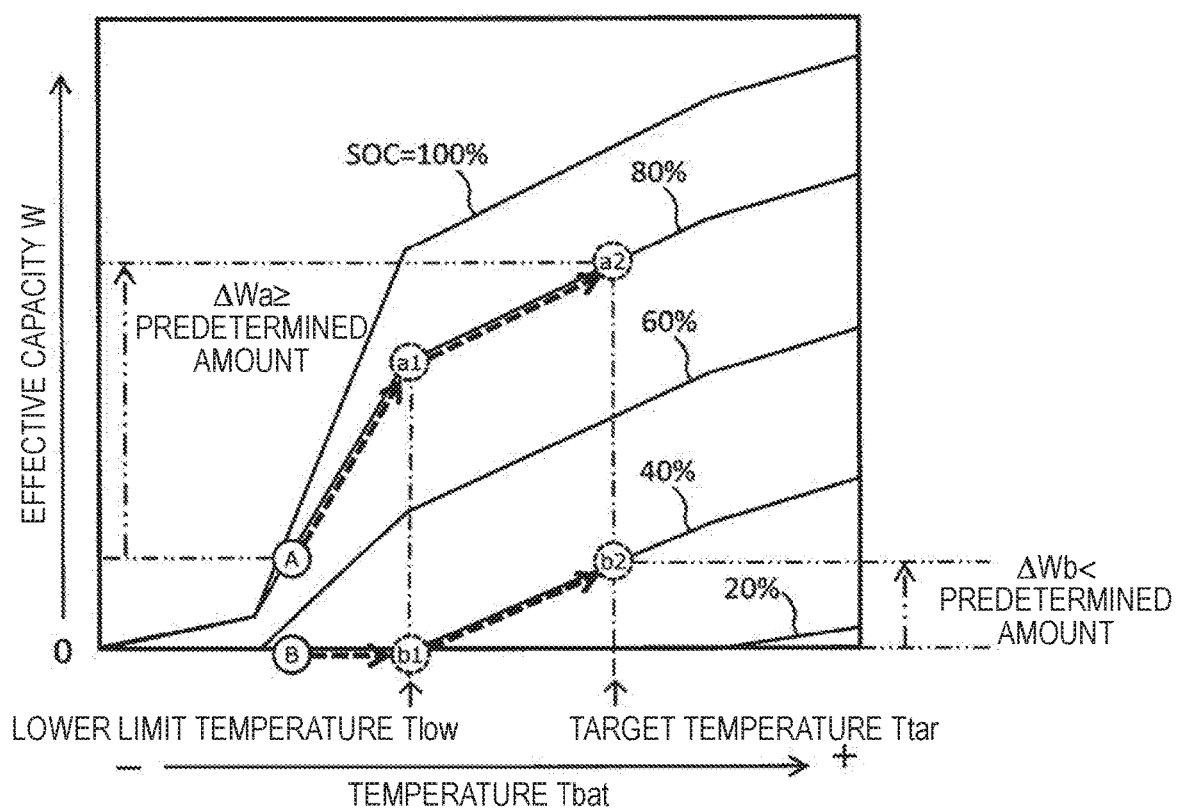
FIG. 8 is a graph illustrating an effective capacity corresponding to the temperature and the SOC of the storage battery.

According to the heating control of the storage battery 203 using the heater 215 by the ECU 221 according to the example in a case the electric vehicle is parked in a state where the plug 223 is connected to the external power supply, in a case where the storage battery 203 in which the temperature and the SOC are in a state indicated by "A" in FIG. 8 reaches a target temperature Tar, the change ΔWa in effective capacity is expected to be increased by the predetermined amount or more. Therefore, the current flow controller 267 causes the switch portion 219 to be closed, causes the switch portion 217 to be opened, and causes a current to flow through the heater 215 using electric power supplied from the external power supply. On the other hand, in a case where the storage battery 203 in which the temperature and the SOC are in a state indicated by "B" in FIG. 8 reaches the target temperature Ttar, the current flow controller 267 performs the following control. In a case where the change ΔWb in effective capacity is expected to be increased by the predetermined amount or more and the temperature Tbat of the storage battery 203 is lower than a lower limit temperature Tlow, the current flow controller 267 causes the switch portion 219 to be closed, causes the switch portion 217 to be opened, and causes a current to flow through the heater 215 using electric power supplied from the external power supply until the temperature Tbat of the storage battery 203 reaches the lower limit temperature Tlow. After the temperature Bat of the storage battery 203 reaches the lower limit temperature Tlow, the current flow controller 267 causes the switch portion 219 to be opened, causes the switch portion 217 to be closed, and causes the storage battery 203 to be charged by electric power supplied from the external power supply. The lower limit temperature Tlow is the lowest temperature at which the effective capacity of the storage battery 203 is expected to be increased to some extent during the charging the storage battery 203.

As described above, according to the example, in a case where the change in effective capacity is expected to be increased by a predetermined amount or more by heating the storage battery 203 up to the target temperature Ttar, electric power supplied from the external power supply is used to cause a current to flow through the heater 215. In a case where the change in effective capacity is expected to be increased less than a predetermined amount, electric power supplied from the external power supply is used to charge the storage battery 203. This way, electric power supplied from the external power supply is consumed by the heater 215 only in a case where the effective capacity is expected to be improved by heating the storage battery 203. Therefore, electric power supplied from the external power supply can be effectively consumed to improve the performance of the storage battery 203 without being consumed to inefficiently heat the storage battery 203. When the temperature Tbat of the storage battery 203 is lower than the lower limit temperature Tlow, even in a case where the change in effective capacity is expected to be increased less than a predetermined amount by heating the storage battery 203 up to the target temperature Ttar, the heater 215 operates due to electric power supplied from the external power supply until the temperature Tbat of the storage battery 203 decreases up to the lower limit temperature Tlow. After the temperature Tbat of the storage battery 203 reaches the lower limit temperature Tlow, electric power supplied from the external power supply is used to charge the storage battery 203. This way, the temperature Tbat of the storage battery 203 increases to the lower limit temperature Tlow or higher. Therefore, external power supply supplied from the external power supply can be used to improve the effective capacity of the storage battery.

Example 2

Figure 9:
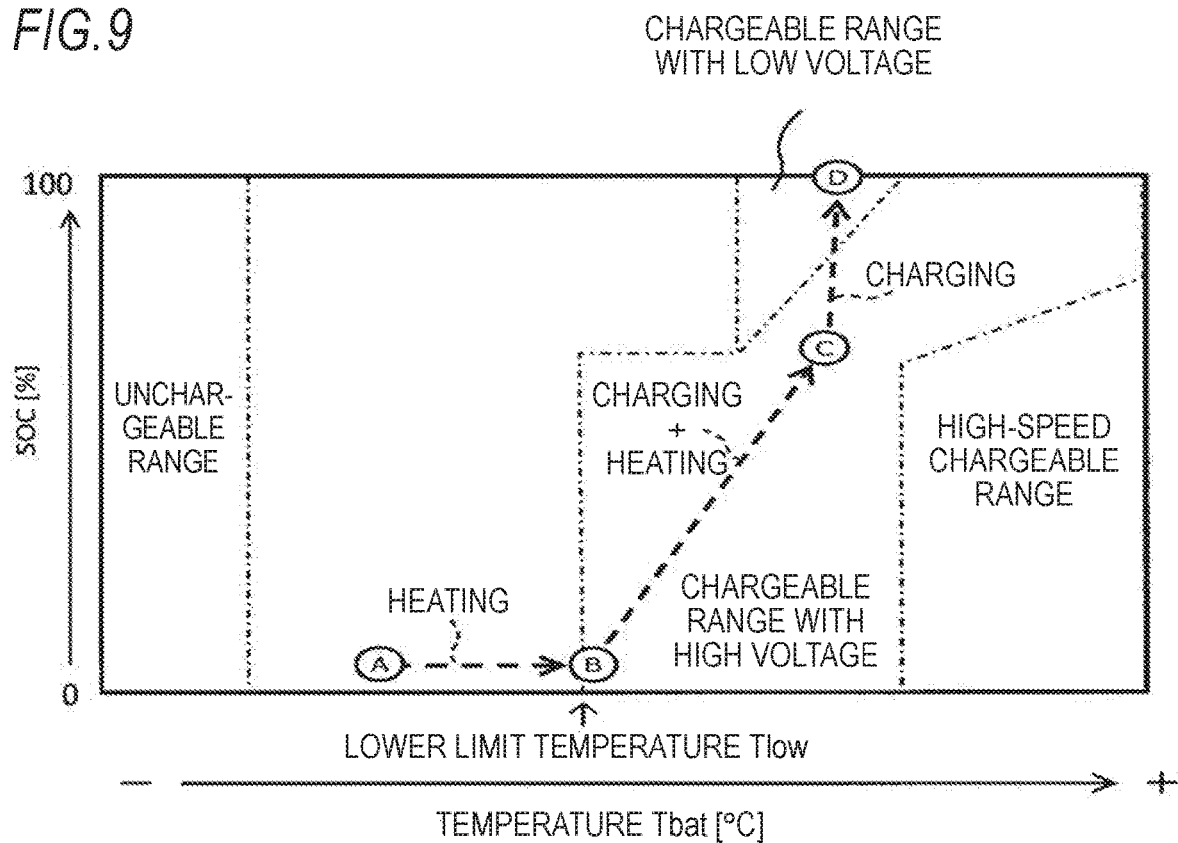
FIG. 9 is a diagram illustrating a control that relates to heating and charging of the storage battery according to Example 2 of the second embodiment.

FIG. 9 is a diagram illustrating a control that relates to heating and charging of the storage battery 203 according to Example 2 of the second embodiment. In an example illustrated in FIG. 9, the start time of charging of the storage battery 203 is preset by the ECU 221, and the ECU 221 causes the charger 213 such that the storage battery 203 starts to be charged by electric power supplied from the external power supply at the preset time. In the example, in a case where the temperature Tbat of the storage battery 203 before the charging start time is lower than the lower limit temperature Tlow indicated by "A" in FIG. 9, the ECU 221 causes the switch portion 219 to be closed, causes the switch portion 217 to be opened, and causes a current to flow through the heater 215 using electric power supplied from the external power supply. The lower limit temperature refers to the lowest temperature at which the storage battery 203 can be charged at a high voltage in a state where the SOC of the storage battery 203 is low. In a case where the temperature Tbat of the storage battery 203 decreases up to the lower limit temperature Tlow to enter a state indicated by "B" in FIG. 9 by the heater 215 heating the storage battery 203, the ECU 221 maintains this state.

At the charging start time, the ECU 221 causes the switch portion 219 to be closed, causes the switch portion 217 to be closed, and causes a current to flow through the heater 215 using electric power supplied from the external power supply, and concurrently causes the storage battery 203 to be charged. At this time, the temperature Tbat of the storage battery 203 increases up to the lower limit temperature Tlow. Therefore, the storage battery 203 is charged at a high temperature. Next, in a case where the SOC of the storage battery 203 exceeds a predetermined value, the ECU 221 causes the switch portion 219 to be opened and stops a current from flowing through the heater 215, and then continues the charging of the storage battery 203.

As described above, according to the example, in a case where the temperature Tbat of the storage battery 203 before the charging start time is lower than the lower limit temperature Tlow, the storage battery 203 is heated to the lower limit temperature Tlow or higher until the charging start time. In a case where the storage battery 203 is charged after the charging start time, the storage battery 203 is heated not only by the heater 215 but also by heat generated when the charger 213 performs the electric power conversion during the charging of the storage battery 203. Therefore, the amount of electric power required to heat the storage battery 203 can be reduced. In addition, by setting the lower limit temperature Tlow as the lower limit of the temperature at which the storage battery 203 can be charged at a high voltage, the amount of electric power required to heat the storage battery 203 until the charging start time can be reduced. In addition, in a case where the SOC of the storage battery 203 exceeds the predetermined value, the improvement of the performance obtained by increasing the SOC is more efficient than the improvement of the performance obtained by heating the storage battery 203. Therefore, after the SOC of the storage battery 203 exceeds the predetermined value, only the charging of the storage battery 203 is performed without causing a current to flow the heater 215. As a result, the amount of electric power required to heat the storage battery 203 can be reduced.

Example 3

Figure 10:
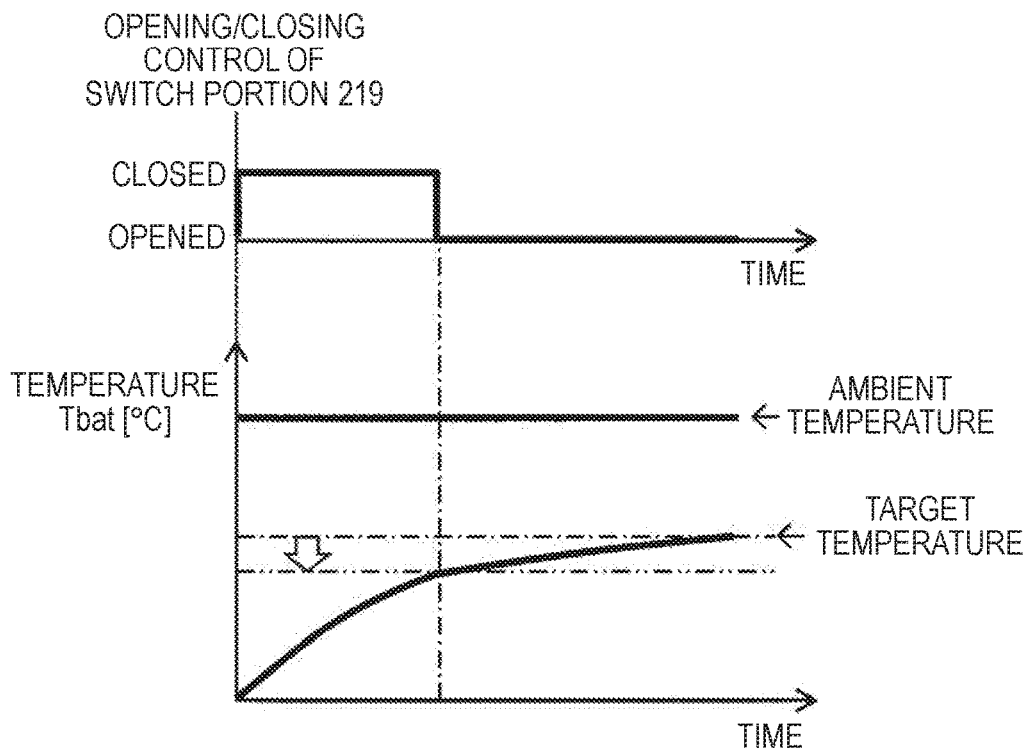
FIG. 10 is a diagram illustrating a heating control of the storage battery according to Example 3 of the second embodiment.

FIG. 10 is a diagram illustrating a heating control of the storage battery 203 according to Example 3 of the second embodiment. In an example illustrated in FIG. 10, it is assumed that a state where the electric vehicle travels in the middle of winter, arrives at a garage at normal temperature, and is parked in the garage in a state where the plug 223 is connected to the external power supply is continued. The electric vehicle includes a temperature sensor (not illustrated) that measures an ambient temperature of the electric vehicle.

In a case where the plug 223 is connected to the external power supply, the temperature Tbat of the storage battery 203 immediate after the electric vehicle starts traveling is low. Therefore, the ECU 221 causes the switch portion 219 to be closed, and causes a current to flow through the heater 215 using electric power supplied from the external power supply. At this time, in a case where the ambient temperature of the electric vehicle is higher than the target temperature of the storage battery 203, the ECU 221 causes a current to flow through the heater 215 from the external power supply until the temperature of the storage battery 203 reaches a predetermined temperature lower than the target temperature.

As described above, according to the example, in a case where the ambient temperature of the electric vehicle is higher than the target temperature of the storage battery 203, the temperature of the storage battery 203 is likely to naturally reach the target temperature without heating the storage battery 203 to the target temperature. Therefore, the storage battery 203 may be heated to a predetermined temperature lower than the target temperature. In this case, the amount of electric power required to heat the storage battery 203 can be reduced compared to a case where the storage battery 203 is heated to the target temperature.

Example 4

Figure 11:
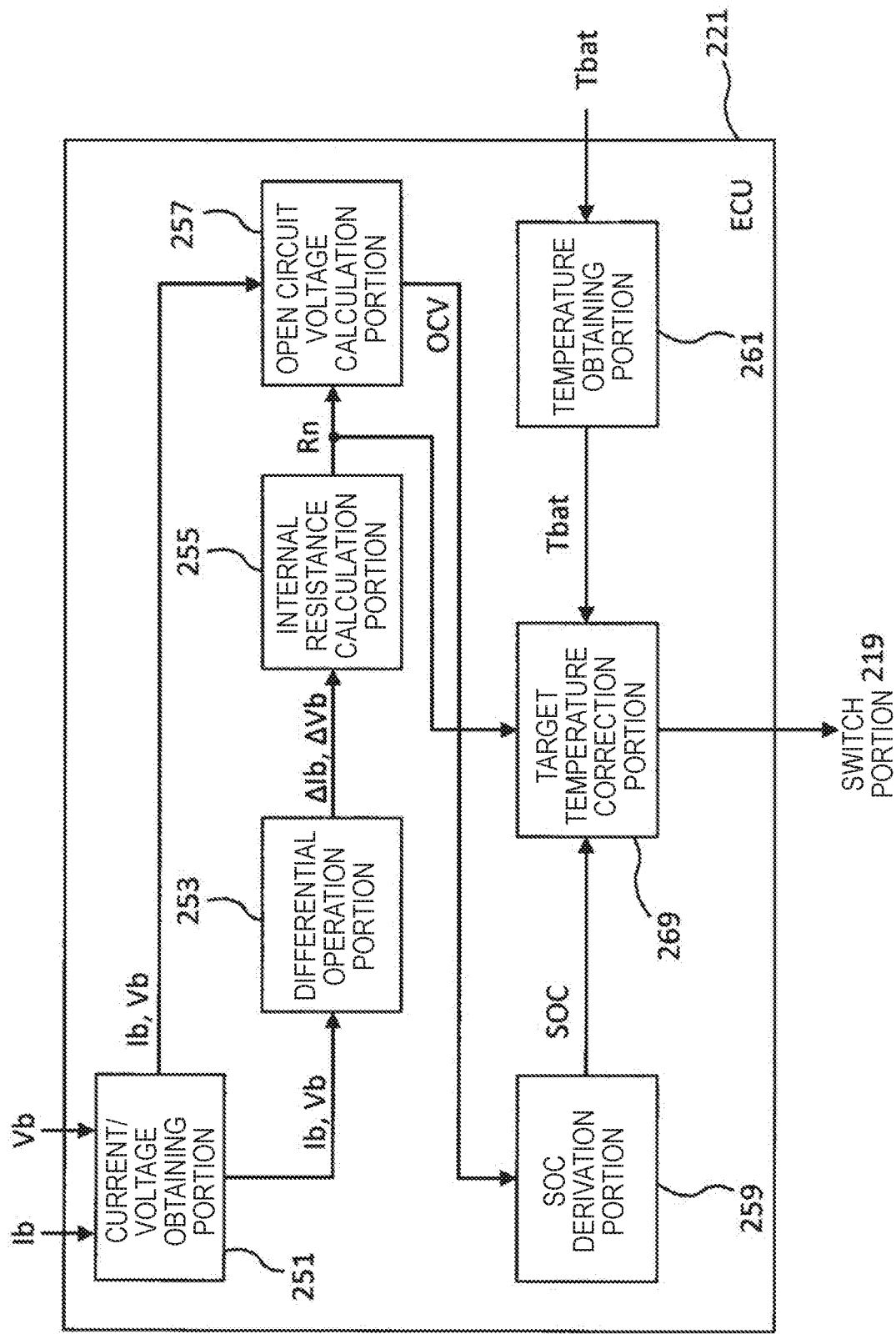
FIG. 11 is a block diagram illustrating an internal configuration of the ECU according to Example 4 of the second embodiment.

FIG. 11 is a block diagram illustrating an internal configuration of the ECU 221 according to Example 4 of the second embodiment. As illustrated in FIG. 11, THE ECU 221 includes a current/voltage obtaining portion 251, a differential operation portion 253, an internal resistance calculation portion 255, an open circuit voltage calculation portion 257, an SOC derivation portion 259, a temperature obtaining portion 261, and a target temperature correction portion 269.

The current/voltage obtaining portion 251 obtains a charging-discharging current Ib detected by the current sensor 207 and a terminal voltage Vb detected by the voltage sensor 209. The differential operation portion 253 differentiates each of the charging-discharging current Ib and the terminal voltage Vb obtained by the current/voltage obtaining portion 251. The internal resistance calculation portion 255 calculates an internal resistance Rn of the storage battery 203 from the following Expression (5) based on a differential value Δb of the charging-discharging current Ib and a differential value ΔVb of the terminal voltage Vb calculated by the differential operation portion 253.

$$Rn = \Delta Vb / \Delta Ib \qquad (5)$$

The open circuit voltage calculation portion 257 calculates an open circuit voltage OCV of the storage battery 203 from the following Expression (6) based on the internal resistance Rn calculated by the internal resistance calculation portion 255 and the charging-discharging current Ib and the terminal voltage Vb obtained by the current/voltage obtaining portion 251.

$$OCV = Vb + Ib \times Rn \qquad (6)$$

The SOC derivation portion 259 derives an SOC of the storage battery 203 from the open circuit voltage OCV calculated by the open circuit voltage calculation portion 257 using a map. The target temperature correction portion 269 corrects a preset target temperature of the storage battery 203 based on the internal resistance Rn and the SOC of the storage battery 203.

Figure 12:
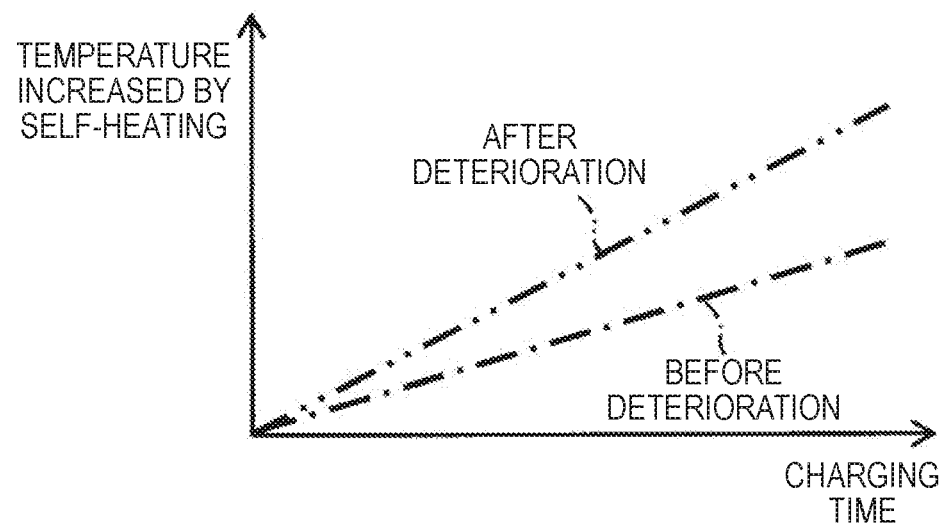
FIG. 12 is a graph illustrating a difference between increased temperatures before and after deterioration of the storage battery, the temperatures being measured when the storage battery is heated by self-heating during charging.
Figure 13:
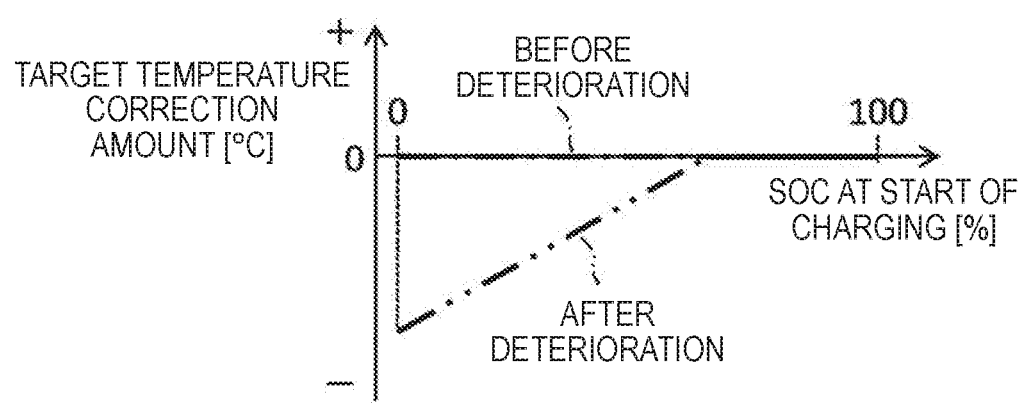
FIG. 13 is a graph illustrating a difference between target temperature correction amounts before and after deterioration of the storage battery according to an SOC at the time of start of charging of the storage battery.
Figure 14:
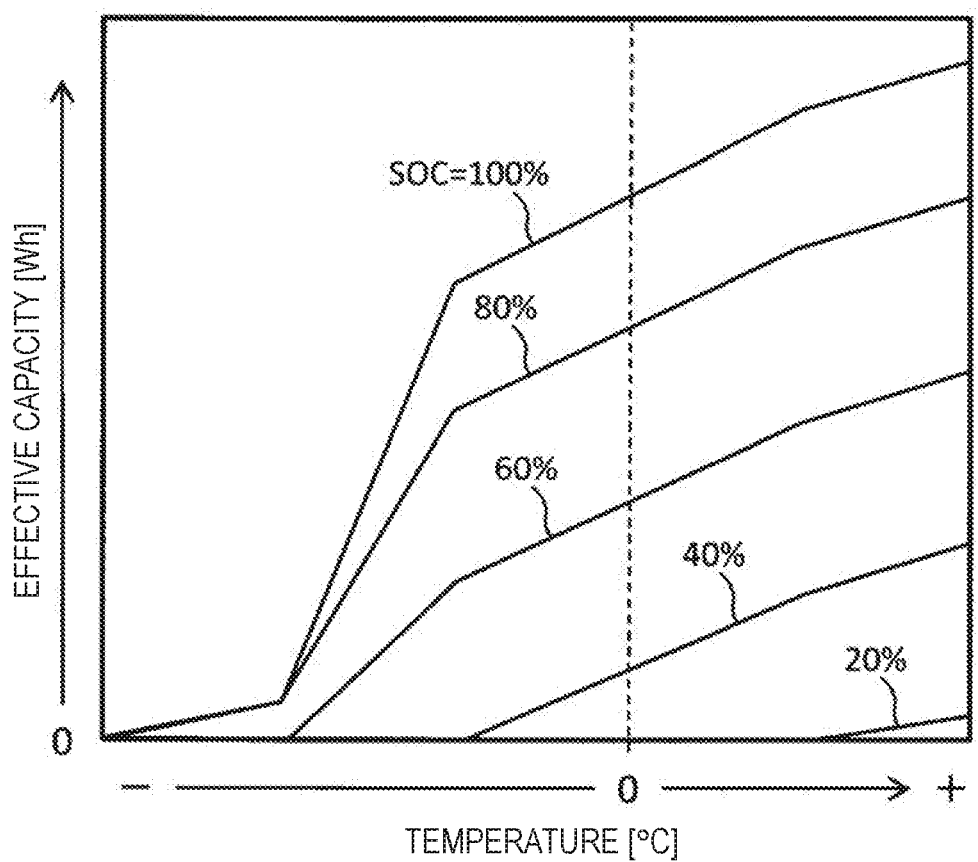
FIG. 14 is a graph illustrating an effective capacity corresponding to a temperature and an SOC of a storage battery.

FIG. 12 is a graph illustrating a difference between increased temperatures before and after deterioration of the storage battery 203, the temperatures being measured when the storage battery 203 is heated by self-heating during charging. In addition, FIG. 13 is a graph illustrating a difference between target temperature correction amounts before and after deterioration of the storage battery 203 according to an SOC at the time of start of charging of the storage battery 203. The internal resistance of the storage battery 203 changes depending on the degree of deterioration. Before deterioration, the internal resistance is low, and as deterioration progresses, the internal resistance increases. During the charging of the storage battery 203, as the charging time increases, the temperature Tbat of the storage battery 203 increases due to self-heating. However, as deterioration progresses, the amount of heat generated during charging increases. Therefore, an increase in temperature becomes significant as illustrated in FIG. 12.

Accordingly, in a case the SOC at the start of charging is lower than a predetermined value such that a longer charging time than a predetermined period of time is expected to be required as illustrated in FIG. 13, the target temperature correction portion 269 according to the example corrects the target temperature to a lower temperature as the degree of deterioration corresponding to the internal resistance of the storage battery 203 increases. The correction amount increases as the SOC at the start of charging becomes lower.

As described above, according to the example, in a case where the storage battery 203 having a high internal resistance is charged after being heated, even when the target temperature is corrected to a lower temperature, the temperature of the storage battery 203 is likely to increase up to a desired temperature during charging. Therefore, the target temperature of the storage battery 203 may be corrected to a lower temperature as the internal resistance increases. In this case, the amount of electric power required to heat the storage battery 203 can be reduced compared to a case where the target temperature is not corrected. In addition, as the SOC of the storage battery 203 decreases, a longer charging time is required. Therefore, the target temperature of the storage battery 203 may be corrected to a lower temperature as the SOC decreases. In this case, the amount of electric power required to heat the storage battery 203 can be reduced compared to a case where the target temperature is not corrected.

Hereinabove, the present invention has been described in detail using the specific embodiments. However, it is obvious to those skilled in the art that various modifications and changes can be made within a range not departing from the spirit and scope of the present invention.

The invention claimed is:

1. A heating control device comprising:
    a storage battery that supplies electric power to an electric motor as a driving source of an electric vehicle;
    a heat generation portion that heats the storage battery using heat generated by current flowing;
    an effective capacity estimation portion that estimates a change in effective capacity when the heat generation portion heats the storage battery to a target temperature using heat generated by current flowing due to electric power supplied from the storage battery based on an effective capacity of the storage battery corresponding to a temperature of the storage battery and a state of charge of the storage battery;
    a first controller that causes a current to flow from the storage battery to the heat generation portion only in a case where the effective capacity estimated by the effective capacity estimation portion is expected to be improved; and
    a second controller that lowers a lower limit temperature of the storage battery stepwise depending on a duration time during which the electric vehicle is not operated and that controls current flowing from the storage battery to the heat generation portion every time the temperature of the storage battery decreases up to the lower limit temperature.

2. The heating control device according to claim 1, wherein:
    the effective capacity estimation portion includes a state-of-charge estimation portion that estimates a change in the state of charge of the storage battery when the storage battery supplies electric power required for the heat generation portion to heat the storage battery to the target temperature;
    the change in the effective capacity estimated by the effective capacity estimation portion is a change from an effective capacity, which corresponds to a temperature and a state of charge of the storage battery before heating by the heat generation portion, to an effective capacity which corresponds to the target temperature and a state of charge after heating estimated by the state-of-charge estimation portion; and
    only in a case where a change in the effective capacity shows an increase of a predetermined amount of more, the first controller causes a current to flow from the storage battery to the heat generation portion until the temperature of the storage battery reaches the target temperature.

3. The heating control device according to claim 1, wherein
    until the lower limit temperature reaches an absolute lower limit temperature, the second controller lowers the lower limit temperature every time causing current flowing from the storage battery to the heat generation portion.

4. The heating control device according to claim 1, wherein
    every time the temperature of the storage battery decreases up to the lower limit temperature, the second controller controls current flowing from the storage battery to the heat generation portion such that the storage battery is heated from the lower limit temperature by a predetermined value.

5. The heating control device according to claim 1, wherein
    when the first controller or the second controller controls current flowing to the heat generation portion, the electric vehicle is in a state where electric power is not supplied from an external power supply.

* * * * *